Nov. 17, 1942.     P. M. FREER     2,302,495
BRAKE
Filed April 28, 1941

INVENTOR
PHELPS M. FREER
BY
ATTORNEYS

Patented Nov. 17, 1942

2,302,495

UNITED STATES PATENT OFFICE 2,302,495

BRAKE

Phelps M. Freer, Detroit, Mich.

Application April 28, 1941, Serial No. 390,791

3 Claims. (Cl. 188—72)

The invention relates to brakes and refers more particularly to disc brakes for use in automobiles, airplanes, and the like.

The invention has for one of its objects to provide a simple construction of brake in which the rotatable brake members are exposed to the atmosphere so that cooling thereof is facilitated.

The invention has for another object to so construct the brake that the rotatable and non-rotatable brake members may be mounted on or removed from the carrier plate as a unit.

The invention has for a further object to so mount the non-rotatable brake members that their friction faces will wear at a substantially equal rate.

With these and other objects in view, the invention resides in the novel features of construction and combinations and arrangements of parts as more fully hereinafter set forth.

In the drawing—

Figure 2:
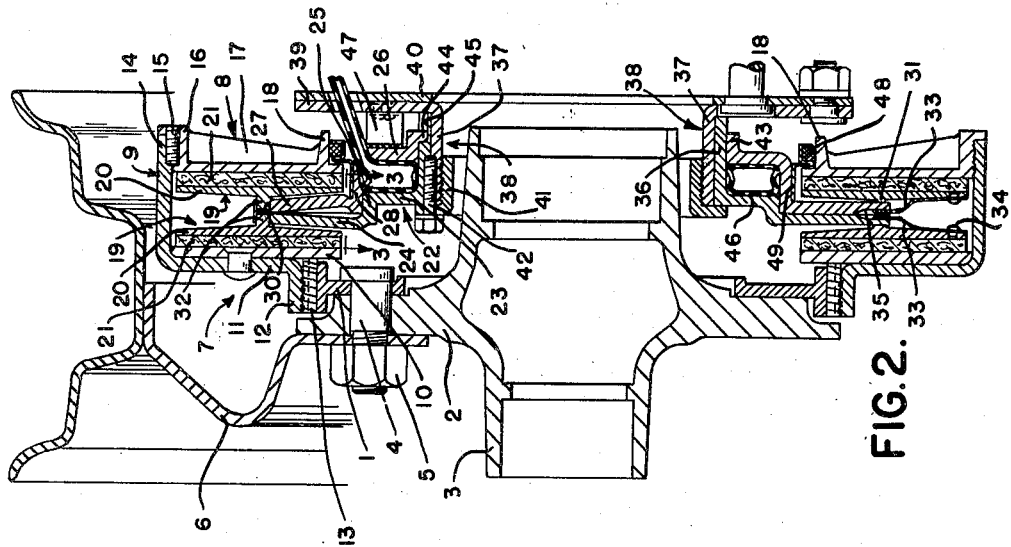
Figure 2 is a cross section on the line 2—2 of Figure 1.
Figure 1:
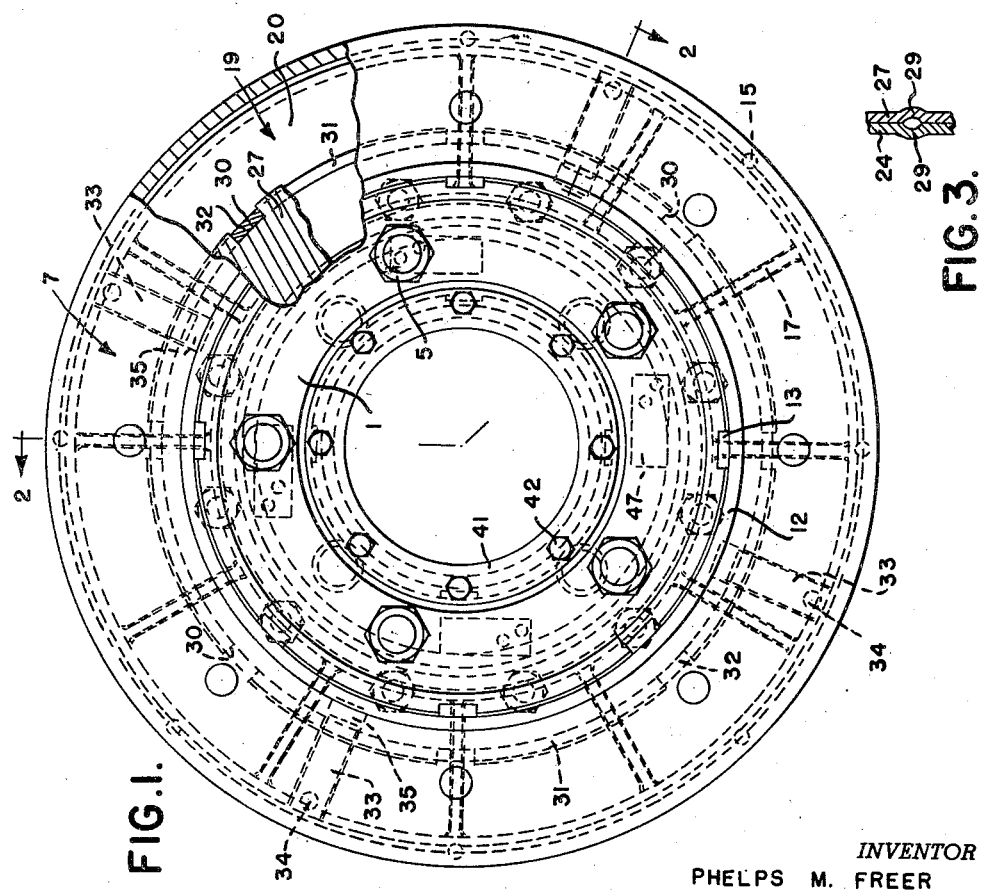
Figure 1 is an elevation, partly broken away, of a brake embodying my invention.
Figure 3:
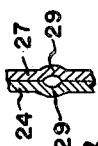
Figure 3 is a cross section on the line 3—3 of Figure 2.

As illustrated in the drawing, the rotatable element of the brake comprises the T-sectioned member 1, the stem of which is secured to the fixed flange 2 of the wheel hub 3 by the bolts 4 which are adapted to receive the nuts 5 for securing the wheel 6 to the hub. The rotatable element also comprises the outboard and inboard disc brake members 7 and 8, respectively, which are axially slidably mounted on the member 1. More particularly, the outboard brake member 7 comprises the shell 9 and the disc 10, the former being in the nature of a cupped member and the latter being secured, as by means of rivets, to the web 11 of the former and having a radially extending friction face. The shell has the central annular axially extending flange 12 to which suitable angularly spaced keys 13 are fixedly secured as by welding. The keys extend axially and slidably engage corresponding key ways formed in the radially outer edge of the flange of the member 1. The inboard brake member 8 is generally channel-shaped in cross section and is secured within the free end of the radially outer annular flange 14 of the shell 9 by being threaded therein and by the lock screw 15 which threadedly engages both the annular flange 14 and the radially outer annular flange 16 of the inboard brake member. The inboard brake member being in the nature of a disc, has a radially extending annular friction face opposed to that of the disc 10.

The brake members 7 and 8 are formed of good heat conducting material and, as shown in the present instance, are metal throughout, their friction faces being metal. The brake members are exposed to the atmosphere so that dissipation of heat generated during application of the brake is facilitated. To assist in heat dissipation, the inboard brake member is formed with the angularly spaced radial ribs 17 between its radially inner and outer annular flanges 18 and 16, respectively.

The non-rotatable element of the brake comprises the oppositely facing outboard and inboard disc brake members 19 each of which is formed of the annular metal shoe disc 20 and the friction lining 21 secured against the radially extending face of the shoe disc as by rivets and entending face of the shoe disc as by rivets and engageable with the friction face of one of the rotatable brake members. The shoe discs are carried by the supporting members 22 which are in the nature of discs. The outboard supporting member has the radially inner and outer disc portions 23 and 24, respectively, connected by the intermediate axial portion 25. The inboard supporting member has the radially inner and outer disc portions 26 and 27, respectively, connected by the intermediate axial portion 28 which encircles and slidably engages the intermediate axial portion 25. The radially outer disc portions 24 and 27 are provided with the registering angularly spaced radial reinforcing ribs 29. The radially outer disc portions are also provided at their outer edges with the registering angularly spaced notches 30. The shoe discs are provided with the arcuate axially extending ribs 31 and projections 32, the former extending between the latter and forming lands or raised seats in an annular zone for engaging the radially outer disc portions. The projections fit in the peripheral notches. Spring clips 33 are pivotally secured to the shoe discs at their radially outer edges by the rivets 34 and engage milled slots 35 formed in the adjacent faces of the supporting members 22. The structure is such that when the radially outer disc portions of the supporting members are axially separated, the spring clips 33 may be rotated about their pivots into engagement with the milled slots to detachably secure the shoe discs to the supporting members. Also, while the disc portions are axially separated, the spring clips may be swung about their pivots out of the milled slots to permit removal of the shoe discs from the supporting members.

For the purpose of substantially equalizing wear throughout the wear surfaces of each of the friction linings 21, the arcuate ribs 31 of the shoe discs are located so that the areas of the wear surfaces of the friction linings radially outwardly beyond the annular zones of the arcuate ribs are greater than the areas radially inwardly and the unit pressures on the radially outward areas are less than on the radially inward areas when the brake is applied. In other words, the supporting members are operatively connected to the shoe discs to exert pressure thereon in annular zones nearer the inner edges than the outer edges of the shoe discs. The areas and the pressures are such as to compensate for the different rates of linear movement of the portions of the faces on the rotatable brake members opposite the areas of the wear surfaces.

The outboard supporting member is provided with the central annular flange 36 which is sleeved over the annular flange 37 of the collar 38 having the radial flange 39 fixedly secured to the carrier plate 40. The nut 41 threaded into the annular flange 37 and extending over the radially inner disc portion 23 of the outboard supporting member clamps the outboard supporting member in place and the cap bolt 42 threadedly engaging both the flanges 36 and 37 holds the outboard supporting member from rotation relative to the collar and also serves to prevent accidental rotation of the nut 41. The inboard supporting member has at its radially inner edge the annular flange 43 which is slidable on the annular flange 36 and is formed with the radial projections 44 for slidably engaging the axially extending grooves 45 in the flange 36. With this arrangement, the inboard supporting member is held from rotation relative to the outboard supporting member.

The supporting members 22 are adapted to be axially separated by the expansible member or actuator 46 which is in the nature of a fluid pressure operated flexible annular tube preferably formed of rubber. The expansible member is located within the annular space formed by the outboard and inboard supporting members and, more particularly, by the radially inner disc portions 23 and 26, the radially inner annular flange 36 and the intermediate annular flange 28.

For the purpose of normally holding the parts in their retracted positions, there are the curved springs 47 each fixedly secured at one end to the radial flange 39 of the collar 38. The other end of each of the springs abuts the radially inner disc portion 26 of the inboard supporting member 22 and is adapted to move the same axially in an outboard direction.

To seal the brake, I have provided the packing ring 48 which is carried by the annular support 49 and which engages the radially inner face of the radially inner annular flange 18 of the inboard rotatable brake member 8. The annular support is fixedly secured by suitable means to the intermediate annular portion 28 of the inboard supporting member.

With the construction as thus far described, if it is desired to disassemble the brake it can be readily accomplished by removing the wheel 6, the hub 3 and the member 1, and by then removing the cap bolt 42 and the nut 41, after which the rotatable brake members 7 and 8, the non-rotatable brake members 19, their supporting members 22 and the actuator 46 can be removed as a unit from the collar 38.

When the parts of the brake are in inoperative or off position, the non-rotatable inboard brake member is held in retracted position bearing against the non-rotatable outboard brake member by the springs 47 which resiliently urge the former brake member in an outboard direction. Also the rotatable outboard and inboard brake members 7 and 8, respectively, are in positions with their friction faces out of engagement with the friction linings 21 of the non-rotatable brake members. When the expansible member or actuator 46 is actuated by fluid pressure the non-rotatable inboard brake member is moved in an inboard direction against the pressure exerted by the springs 47 to force its friction lining 21 into engagement with the rotatable inboard brake member 8. As a result, the latter causes the rotatable outboard brake member 7 to move in an inboard direction into engagement with the friction lining 21 of the stationary non-rotatable outboard brake member, at which time the brake parts are in operative or applied position. When the fluid pressure on the expansible member or actuator is released the non-rotatable inboard brake member is moved in an outboard direction out of frictional contact with the rotatable inboard brake member, after which the rotatable outboard brake member is moved in an outboard direction out of frictional contact with the stationary non-rotatable outboard brake member. If the latter movement has not been completed immediately upon the release of braking pressure, it is completed as soon as rotation of the rotatable brake members relative to the non-rotatable brake members takes place.

What I claim as my invention is:

1. A brake, comprising a rotatable brake member having a disc face, a non-rotatable brake member having a disc face engageable with said first mentioned disc face, a support for said non-rotatable brake member, and means for securing said non-rotatable brake member to said support comprising clips pivoted to said non-rotatable brake member and overlapping said support.

2. A brake, comprising a rotatable brake member having a radially extending disc face, a non-rotatable annular brake member having a radially extending disc face engageable with said first mentioned disc face and provided with axially extending projections, a supporting member for said non-rotatable brake member having notches in its outer edge engageable with said projections and arcuate ribs between said notches for abutting said non-rotatable brake member, and means for securing said non-rotatable brake member to said supporting member, comprising clips pivoted to said non-rotatable brake member and overlapping said supporting member opposite said non-rotatable brake member.

3. A brake, comprising spaced rotatable disc brake members, non-rotatable disc brake members between said rotatable brake members, said rotatable and non-rotatable brake members being relatively movable axially into and out of frictional engagement, a supporting collar, a supporting disc member mounted on said collar and carrying one of said non-rotatable brake members, a second supporting disc member mounted on said first mentioned supporting disc member and carrying the other of said non-rotatable brake members, said supporting disc members being held from rotation relative to each other but being relatively movable in an axial direction, and an expansible member between said supporting disc members for effective relative movement thereof.

PHELPS M. FREER.